United States Patent
Ko et al.

[11] Patent Number: 5,845,039
[45] Date of Patent: Dec. 1, 1998

[54] TIME-BASE CORRECTION IN A VIDEO RECORDING/PLAYBACK SYSTEM

[75] Inventors: Jung-Wan Ko, Suwon, Rep. of Korea; Alvin R. Balaban, Lebanon, N.J.; Christopher H. Strolle, Glenside, Pa.

[73] Assignee: SamSung Electronics Co., Ltd., Suwon, Rep. of Korea

[21] Appl. No.: 431,937

[22] Filed: May 1, 1995

Related U.S. Application Data

[62] Division of Ser. No. 839,542, Feb. 24, 1992, Pat. No. 5,412,481.
[51] Int. Cl.$^6$ .......................... H04N 9/896; H04N 11/02; H04N 9/79
[52] U.S. Cl. ................................ 386/16; 386/20; 386/33; 348/427; 348/498
[58] Field of Search ................................. 386/13, 16, 21, 386/26, 27, 33, 20, 85, 90; 348/427–431, 497–499; H04N 9/79, 9/896, 11/02

[56] References Cited

U.S. PATENT DOCUMENTS

| | | | |
|---|---|---|---|
| 4,831,463 | 5/1989 | Faroudja | 386/27 |
| 5,031,030 | 7/1991 | Hurst, Jr. | 348/427 |
| 5,072,315 | 12/1991 | Tsunashima | 386/91 |
| 5,093,732 | 3/1992 | Yoshinaka | 386/91 |
| 5,113,262 | 5/1992 | Strolle et al. | 386/27 |
| 5,218,449 | 6/1993 | Ko et al. | 358/335 |
| 5,245,430 | 9/1993 | Nishimura | 386/90 |
| 5,253,118 | 10/1993 | Konno | 386/90 |
| 5,347,316 | 9/1994 | Ogura | 386/90 |
| 5,371,601 | 12/1994 | Kim | 348/427 |
| 5,386,235 | 1/1995 | Ko | 348/427 |
| 5,430,497 | 7/1995 | Strolle et al. | 348/607 |
| 5,510,898 | 4/1996 | Yoshimura et al. | 386/13 |
| 5,526,129 | 6/1996 | Ko | 348/571 |

*Primary Examiner*—Thai Tran
*Attorney, Agent, or Firm*—Robert E. Bushnell, Esq.

[57] ABSTRACT

A video recording/playback system includes in its recording electronics time-base correctors both for luma signal and for color-under signal, the time-base corrector for luma signal being used to facilitate comb filtering and the time-base corrector for chroma signal being used to maintain luma/chroma tracking during recording. The video recording/playback system includes in its playback electronics time-base correctors both for played-back luma signal and for played-back color-under signal, the time-base corrector for played-back luma signal being used to facilitate comb filtering and the time-base corrector for played-back chroma signal being used to maintain luma/chroma tracking during playback. With appropriate switching, the same pair of time-base correctors can be used in both the recording and the playback electronics of a video recording/playback system. A detector in the recording electronics determines when there is substantial time-base error in the video signal received for recording and conditions the comb filtering of the luma signal during recording to be carried out in just the spatial domain and not in the frame-to-frame time domain. The recording electronics includes circuitry for signaling the playback electronics, via a recorded signal, that the comb filtering of the luma signal during recording was carried out in just the spatial domain and not in the frame-to-frame time domain. The playback electronics responds to such signaling to adapt the comb filtering of the played-back luma signal to suit.

36 Claims, 10 Drawing Sheets

TIME-BASE CORRECTION IN A VIDEO RECORDING/PLAYBACK SYSTEM

CROSS-REFERENCE TO RELATED APPLICATIONS

This divisional application makes reference to, incorporates herein and claims all benefits accruing from our application earlier filed in the U.S. Patent & Trademark Office on the 24th of February 1992 entitled TIME-BASE CORRECTION IN A VIDEO RECORDING/PLAYBACK SYSTEM assigned Ser. No. 07/839,542, which subsequently issued on the 2nd of May 1995 as U.S. Pat. No. 5,412,481.

The invention relates to video recording/playback systems and, more particularly, to correcting time-base errors in household video cassette recorders (VCRs).

BACKGROUND OF THE INVENTION

Recently, along with the development of digital processing techniques for video signals, household VCRs have come onto the market that are designed to provide higher resolution and better quality images. In an improved VHS system generally referred to as super-VHS (S-VHS), the full bandwidth of NTSC television signal is recorded on a magnetic recording medium of a limited bandwidth in the video tape cassette. Then, an image with improved quality is reproduced, providing high resolution.

The specification and drawing of allowed U.S. patent application Ser. No. 07/569,029 filed by the inventors and their co-workers on 17 Aug. 1990; entitled "AN IMPROVED VIDEO SIGNAL RECORDING SYSTEM"; and assigned to Samsung Electronics Co., Ltd., now U.S. Pat. No. 5,113,262 is incorporated herein by reference. This system was developed to provide a higher-resolution home VCR that unlike S-VHS home VCRs is compatible with the standard VHS system.

The video signal recording and playback system that is described in U.S. Pat. No. 5,113,262 follows in some respects the standard VHS system procedure for recording and playing chroma information in the color-under format. The standard VHS system procedure for playing back chroma information recorded in the color-under format includes measures as described in the next paragraph, which prevent time-base error (TBE) in the video signals from introducing color errors. For example, TBE occurs in the video signals to be recorded when they are supplied from another video recorder owing to speed variations of the tape transport used for playback, to tape vibration, etc. During recording, further TBE arises owing to speed variations of the tape transport used for recording, to tape vibration, etc. During subsequent playback, still further TBE arises owing to speed variations of the tape transport used for playback, to tape vibration, etc.

During recording, separated chrominance sidebands with a suppressed 3.58 MHz carrier are heterodyned with 4.21 MHz oscillations to generate complex amplitude-modulation sidebands of a 629 kHz suppressed carrier. Intervening color bursts are heterodyned down to 629 kHz during this down-conversion procedure for generating a color-under signal. The 4.21 MHz oscillations used in the down-conversion are a so-called "nervous clocking signal" supplied from a phase-locked oscillator (PLO). This PLO includes a voltage-controlled oscillator (VCO), the frequency and phase of the VCO being electrically controlled by an error signal and synchronized to a multiple of the scan line frequency. To achieve such synchronization, the VCO is included in a corrective-feedback loop connection in which the VCO supplies its oscillations to a frequency-divider, the frequency-divider supplies a submultiple of the oscillations to the frequency and phase comparator, the frequency and phase comparator supplies its comparison results to a loop filter that determines the speed with which the error signal can be diminished by the loop connection, and the filter response is applied to the VCO for regulating the frequency and phase of its oscillations, thereby completing the corrective-feedback loop that adjusts the frequency and phase of the oscillations from the VCO to diminsh the error signal. If the filter response time constant is not appreciably longer than a scan line duration, the frequency and the phase of the 4.21 MHz oscillations vary in accordance with the TBE in the horizontal synchronization. In the down-conversion to 629 kHz, the TBE in the chroma differentially combines with the TBE in the 4.21 MHz oscillations, so that the color-under carrier is essentially free of TBE. During playback, in an up-conversion procedure, stable 4.21 MHz oscillations are heterodyned with the color-under signal to regenerate color burst and chroma sidebands, the 3.58 MHz carrier of which is essentially free of TBE.

The video signal recording and playback system that is described by the inventors and their co-inventors in U.S. patent application Ser. No. 07/569,029 departs from the standard VHS system procedure for recording and playing chroma information in the color-under format, and here it is pointed out. The 4.21 MHz sinusoidal signals used in the down-converting and up-converting procedures associated with color-under signals are not generated directly using a phase-locked analog oscillator oscillating at a 4.21 Mhz frequency. Instead, a higher-frequency analog oscillator is phase-locked to the horizontal synchronizing pulses and its oscillations are counted to determine pixel scanning addresses along each scan line. The pixel scanning addresses are used in the spatio-temporal filtering of digitized luminance signals. The 4.21 Mhz frequency nervous clocking signal is then derived from the higher-frequency oscillations using a sine-wave look-up table stored in read-only memory (ROM) or is generated by heterodyning a stable oscillator with the higher-frequency oscillations or a submultiple of those oscillations as obtained by frequency division.

The playback circuitry for a video signal recording and playback system that is described in U.S. patent application Ser. No. 07/569,029 includes a time-base corrector (TBC) that corrects during playback for the time-base error (TBE) in the luminance signal. A TBC designates a device in which time-base error included in a video signal is eliminated by a memory which functions as a time-base buffer. The video signal with the TBE is written into the memory in accordance with a clock signal synchronized with the video signal and the TBE and is read out in accordance with a stable clock signal. The term "TBE" denotes the jitter introduced into a signal by the mechanical factors in a VCR recording and playback system, such as speed variations of the tape transport during recording and during playback, tape vibration, etc. Because of the TBE in the output signal from a VCR, such a signal is classified by circuitry in the VCR as being a non-standard signal. Digital signal processing techniques that require high time-base stability, in order to implement signal processing in the temporal dimension, are, the inventors believe, best discontinued when the VCR receives an input signal that exhibits sufficient jitter to be classified as a non-standard signal.

That is to say, suppose a first high-resolution home VCR, employing the frequency-folding technique to reduce the bandwidth of recorded luminance signal, plays back a video signal that could be classified as being a non-standard signal because of the substantial amount of TBE included in that signal; and suppose further that the played-back video signal is to be recorded by a second high-resolution home VCR, employing the frequency-folding technique to reduce the bandwidth of the recorded luminance signal. Then, the jitter included in the video signal played back from the first VCR would have to be corrected before performing three-dimensional signal processing—i. e., processing both in the one-dimensional time domain and in the two-dimensional spatial domain—as a procedure in the recording with the second VCR.

In professional video recorders, such as those used in television broadcasting, the tape spooling and capstan mechanisms are considerably better than home VCRs in regard to avoiding undesired tape movements. The results of the recording procedure can be monitored by separate playback heads. The operating speed of the headwheel is controlled by a servomechanism that corrects by degenerative feedback the frequency and phase errors between a very stable, crystal local color oscillator and the color burst regenerated from played-back video. The reduction of TBE during recording makes it substantially easier to time-base-correct the video signal during playback. The foregoing measures, however, are too expensive to be used in home VCRs.

In prior-art home VCRs time-base correction is carried out only during playback and without involving the use of servomechanisms to finely regulate operating speeds. The complexity of the TBE correcting circuits that would be required to provide time stability between successive fields of video samples is increased by the fact that the signal processing in the two-dimensional spatial domain is done over a region spanning seven lines in the vertical direction. That is, the problem of implementing TBC is compounded by the need simultaneously to align samples in adjoining scan lines so as to implement signal processing in the two-dimensional spatial domain. Accordingly, the time-base stability of the corrected signal from the TBC is insufficient for performing high-resolution processing in the temporal domain as well as the two-dimensional spatial domain. The phase-locked oscillator (PLO) circuit which adjusts the timing of the TBC input sampling clock so as to synchronize with a multiple of the horizontal sync signal frequency, is unable to track the error of the input signal sufficiently closely, particularly during the time that head switching takes place and timing errors tend to be most severe. Tracking problems arise because of noise; because the time constant of the corrective-feedback loop connection that is used to control the frequency and phase of the oscillator has to be too slow, so as not to disrupt spatial filtering procedures; or because of feedback loop instability during playback.

SUMMARY OF THE INVENTION

An aspect of the invention concerns a home VCR that uses digital circuitry requiring, in order to implement signal processing in the temporal dimension, high time-base stability in signals that the VCR receives for recording. The VCR includes circuitry for classifying any such signal which exhibits more than a specified amount of jitter as a "non-standard signal", and circuitry responsive to such classification being made for disabling digital signal processing in the temporal dimension that requires high time-base stability.

Another aspect of the invention is a time-base corrector (TBC) of simple structure that is well-suited to implementing spatial processing and filtering over a band of seven horizontal scan lines or so. The TBE in the luma signal is suppressed using a first-in/first-out or earliest-in/earliest-out memory (or FIFO, for short) written with a write-clock signal that accurately and rapidly follows any jitter of the incoming composite video signal that is to be recorded. The FIFO is read with a more-stable-with-time read-clock signal that follows a low-pass filter response to any jitter of the incoming composite video signal that is to be recorded. The low-pass filter has a time constant of twenty horizontal scan lines approximately. This permits time-base error correction by simple circuitry.

Another aspect of the invention concerns a video recording/playback system in which time-base correction is performed during recording. The problem of differential time-base error being introduced between chroma and luma signals during recording, owing to TBC of the luma signal, is avoided by adding to a color-under signal TBC identical to the TBC afforded the luma signal.

DETAILED DESCRIPTION OF THE INVENTION

Figure 1:
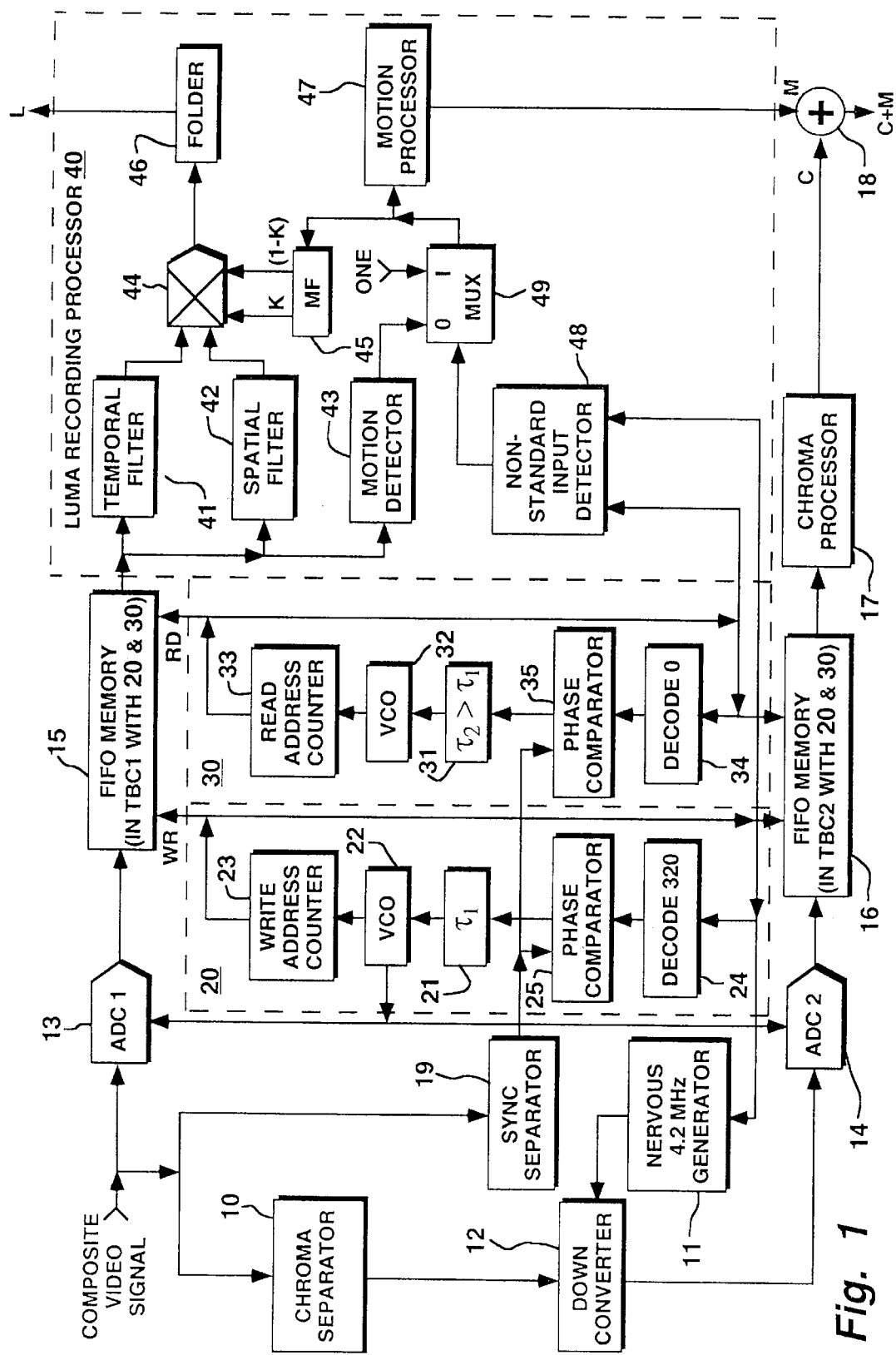
FIG. 1 is a schematic diagram of video recording circuitry embodying aspects of the invention.

Referring to FIG. 1, the recording circuit for a video recording/playback system embodying the invention comprises a chroma separator 10 connected for separating chroma from a composite video signal, a generator 11 of a nervous 4.21 MHz sinusoidal carrier signal, a down-converting mixer 12 for generating a color-under signal responsive to separated chroma and the nervous 4.21 MHz sinusoidal carrier signal, a first analog-to-digital converter (ADC1) 13 for the composite video signal, a second analog-to-digital converter 14 (ADC2) for the color-under signal, a first first-in/first-out (FIFO) memory 15 for the digitized composite video signal, a second first-in/first-out (FIFO)

memory 16 for the digitized color-under signal, a chroma recording processor 17, a digital adder 18 used for combining chroma and motion sidebands, and a sync separator 19 for separating both horizontal and vertical synchronizing pulses from the composite video signal. A first time-base corrector (TBC1) is formed from the first-in/first-out memory 15 in combination with a write-address generator 20 and a read-address generator 30. A second time-base corrector (TBC2) is formed from the first-in/first-out memory 16 in combination with the write-address generator 20 and the read-address generator 30. In addition, the recording circuit further comprises a luma recording processor 40, which in accordance with the invention includes a non-standard input detector 48 and a multiplexer 49 for modifying the connections in the luma recording processor 40 when a composite video signal with excessive TBE is received for recording.

The write-address generator 20 is a first phase-locked loop (PLL1) that includes elements 21–25. The low-pass filter 21 establishes a loop time constant $\tau_1$ for a PLL1 error signal, which loop time constant $\tau_1$ is little longer than the duration of a horizontal scan line. The voltage-controlled oscillator 22 oscillates at or near a frequency that is a high multiple (e. g., 640) times the horizontal scan line frequency as controlled by the PLL1 error signal filtered by the low-pass filter 21. The oscillations from the VCO 22 control the timing of the sampling performed by the analog-to-digital converters 13 and 14. The write address counter 23 is connected for counting each cycle of the oscillations from the oscillator 22. The three-hundred-twenty count of the write address counter 23 is decoded by the decoder 24 to be supplied as a first input signal to the frequency and phase comparator 25. The second input signal to the comparator 25 comprises separated synchronizing pulses. The comparator 25 is of one of the known types that generates an output signal proportional to the differential delay between corresponding edges of its first and second input signals. The comparator 25 supplies its output signal to the low-pass loop filter 21, closing the phase-locked loop PLL1. Since the loop filter 21 has a time constant a little longer than the duration of one horizontal scan line, the phase-locked loop PLL1 response is to horizontal separated sync pulses, rather than vertical ones, and is fast enough to follow the time-base error of the input signal quite precisely.

The read-address generator 30 is a second phase-locked loop (PLL2) that includes elements 31–35. The low-pass filter 31 establishes a loop time constant $\tau_2$ for a PLL2 error signal, which time constant $\tau_2$ is about twenty times as long as the duration of a horizontal scan line. The voltage-controlled oscillator 32 oscillates at or near a frequency that is the high multiple (e. g., 640) times the horizontal scan line frequency, as controlled by the PLL2 error signal filtered by the low-pass filter 31. The read address counter 33 is connected for counting each cycle of the oscillations from the oscillator 32. The zero count of the write address counter 33 is decoded by the decoder 34 to be supplied as a first input signal to the frequency and phase comparator 35. The second input signal to the comparator 35 comprises separated synchronizing pulses. The comparator 35 is of the same type as the comparator 25 and supplies its output signal to the low-pass loop filter 31, closing the phase-locked loop PLL2. The loop filter 31 time constant being about twenty times as long as the duration of a horizontal scan line allows the second phase-locked loop (PLL2) to be synchronized with the vertical sync signal of the input signal and not to track the quick change of the input signal.

Accordingly, the write-address counter 23 quickly follows timing variations of the composite video input signal and, simultaneously, generates a write-address signal WR which the write-address generator 20 supplies both to the first FIFO memory 15 for digitized composite video signal and to the second FIFO memory 16 for digitized color-under signal. Since read-address counter 33 is synchronized with the timing of the composite video input signal averaged over a long period and is unaffected by tape jitter and the like, counter 33 generates a relatively stable read-address signal RD for the FIFO memory 15 of the time-base corrector TBC1 and for the FIFO memory 16 of the time-base corrector TBC2.

The FIFO memories 15 and 16 are each presumed to be able to store a full scan line of pixels. An offset between the write address supplied to FIFO memories 15 and 16 and the read address supplied to FIFO memories 15 and 16 is necessary in order for the memories to provide their temporary storage functions, without the risk of being overwritten before being read. This offset is simply provided for by arranging the decoders 24 and 34 to generate output ONEs a half-scan-line apart.

The elimination of the time-base error TBE1 in the high-frequency component of the composite video signal by the time-base corrector TBC1 formed by FIFO memory 15 and address generators 20 and 30 facilitates spatial processing of the luma signal in the luma recording processor 40. The luma recording processor 40 includes an adaptive luma signal separator comprising a temporal filter 41, a spatial filter 42, a motion signal detector 43, a soft switch 44, and a motion factor generator 45. The temporal filter 41 is described in U.S. patent application Ser. No. 07/569,029 as being a comb filter including comb filtering of the type known as "frame comb" filtering, which is suited to filtering static rather than moving portions of successive television images. The spatial filter 42 is there described as being a comb filter including comb filtering of the type known as "line comb" filtering, which is suited to filtering moving rather than static portions of successive television images. The motion factor generator 45 generates motion factors K and (1−K) recorded in a read-only memory (ROM) look-up table as addressed by values of the detected motion signal. The soft switch 44 determines the output ratios of temporal filter 41 and spatial filter 42 in response to the supplied motion factors K and (1−K). This adaptive luma signal separator, more particularly described in allowed U.S. patent application Ser. No. 07/569,029 is followed by a spectrum folder 46, preferably of an adaptive type, such as particularly described in U.S. patent application Ser. No. 07/569,029. A motion processor 47 modulates the motion signal from the motion signal detector 43 onto a four-phase carrier to generate a signal M consisting of sidebands that fall in the Fukinuki hole which interleaves with color-under signal C. The signals C and M are supplied as summand input signals to the adder 18.

Only those portions of the luma recording processor 40 modified to perform the present invention will be described in detail below. A difference in the structure of the invention and the structure described in allowed U.S. patent application Ser. No. 07/569,029 is that, responsive to the composite video signal being classified as a non-standard input signal by the non-standard input detector 48, the multiplexer 49 selects arithmetic one, rather than the motion signal ranging from arithmetic zero for no motion to arithmetic one for full motion as generated by the motion detector 43, for application to the motion factor generator 45 and to the motion processor 47. This forces the output values K and (1−K) from the motion factor generator 45 to condition the luma signal L to consist entirely of spatially extracted luma samples, in the case of a non-standard input signal, without regard to the presence or absence of the motion signal. In other words, when a non-standard input signal is detected, the time-base-corrected digitized signal from the FIFO memory 15 is processed primarily in the spatial domain to generate the luma signal L supplied as output signal from the luma recording processor 40.

The non-standard input detector 48 generates a control signal that is either a ONE or a ZERO depending on whether or not the input signal is a non-standard signal including TBE. The non-standard input detector 48 shown in FIG. 1 is assumed to be of a type that senses jitter by determining the difference between the write address WR from the write-address counter 23 and the read address RD from the read-address counter 33 and then determining whether or not the present input video signal is a non-standard signal. A particular embodiment of this type of non-standard input detector is described in detail further on in this specification, with reference to FIG. 4 of the drawing. The non-standard signal detector 48 is not limited to this particular type; all that is required in the construction of the non-standard signal detector is that it can detect whether or not the presently input signal is a non-standard signal including TBE.

The remaining portions of the recording electronics are not shown in FIG. 1, but are similar to those described in U.S. patent application Ser. No. 07/569,029. The luma signal L is converted from digital to analog form and used to frequency-modulate an FM carrier wave. The C+M output signal from the adder 18 is converted from digital to analog form and added to the FM carrier wave. The resulting sum signal is then recorded on a magnetic recording medium using helical scan techniques.

In the chroma signal recording circuitry of the invention, the down-converter 12 receives the nervous 4.21 MHz output signal of generator 11, such that during the down-conversion of the chroma signal, TBE appears in the resulting color-under signal. The TBE introduced into the resulting color-under signal corresponds to the TBE in the sampling clock supplied from the analog-to-digital converter 14. The digital samples supplied from the analog-to-digital converter 14, if they were re-timed in accordance with a stable clock to occur regularly, would thus be free of TBE with respect to color-under carrier frequency. Accordingly, during playback up-conversion with a stable clock can regenerate chroma signals without appreciable error in color subcarrier phasing. This is similar to prior art practice, except for the nervous 4.21 MHz carrier being generated in a different way. In prior-art practice there is no time-base correction of the luminance signal during recording, as can give rise to differential TBE as between luma and chroma signals that will cause a luma/chroma tracking problem during playback. There is no need for time-base correction of the luminance signal, since the luminance signal is not digitized and then digitally filtered during the recording procedure. In prior-art practice the procedure followed during playback, then, is simply to up-convert the color-under signal by mixing it with a stable 4.21 MHz sine wave supplied from a crystal oscillator, thereby to regenerate the chroma sidebands for a composite video signal supplied to a VHF-television-channel modulator. Since the 4.21 MHz sine wave and the carrier of the color-under signal are both free from TBE, the regenerated 3.58 MHz subcarrier as occurs during color burst is free from TBE, which facilitates synchronization of the local color oscillator in a color television receiver. The pull-in range of the AFPC loop of the local color oscillator is much less likely ever to be exceeded.

In video tape recorders in which the luminance signal is digitized and then digitally filtered during the recording procedure, particularly when the digital filtering is in the transversal direction, which are the type of recorders which the invention concerns, time-base correction of the luminance signal is needed in order that the digital filtering can proceed. The generation of the color-under signal by down-converting 3.58 MHz chroma using a 4.21 MHz nervous carrier is done in order to correct for TBE in regard to the color-under carrier frequency. The TBE in regard to the modulating function of the color-under signal is not corrected for by this procedure, however. Because the luminance signal is time-base corrected and the modulating function of the color-under signal is not, there is a resultant differential time-base error between the luminance information in the L signal and the chrominance information in the digitized color-under signal supplied by the analog-to-digital converter 14. This is an impediment to luma/chroma tracking on screen during the playback of recorded video.

Figure 6:
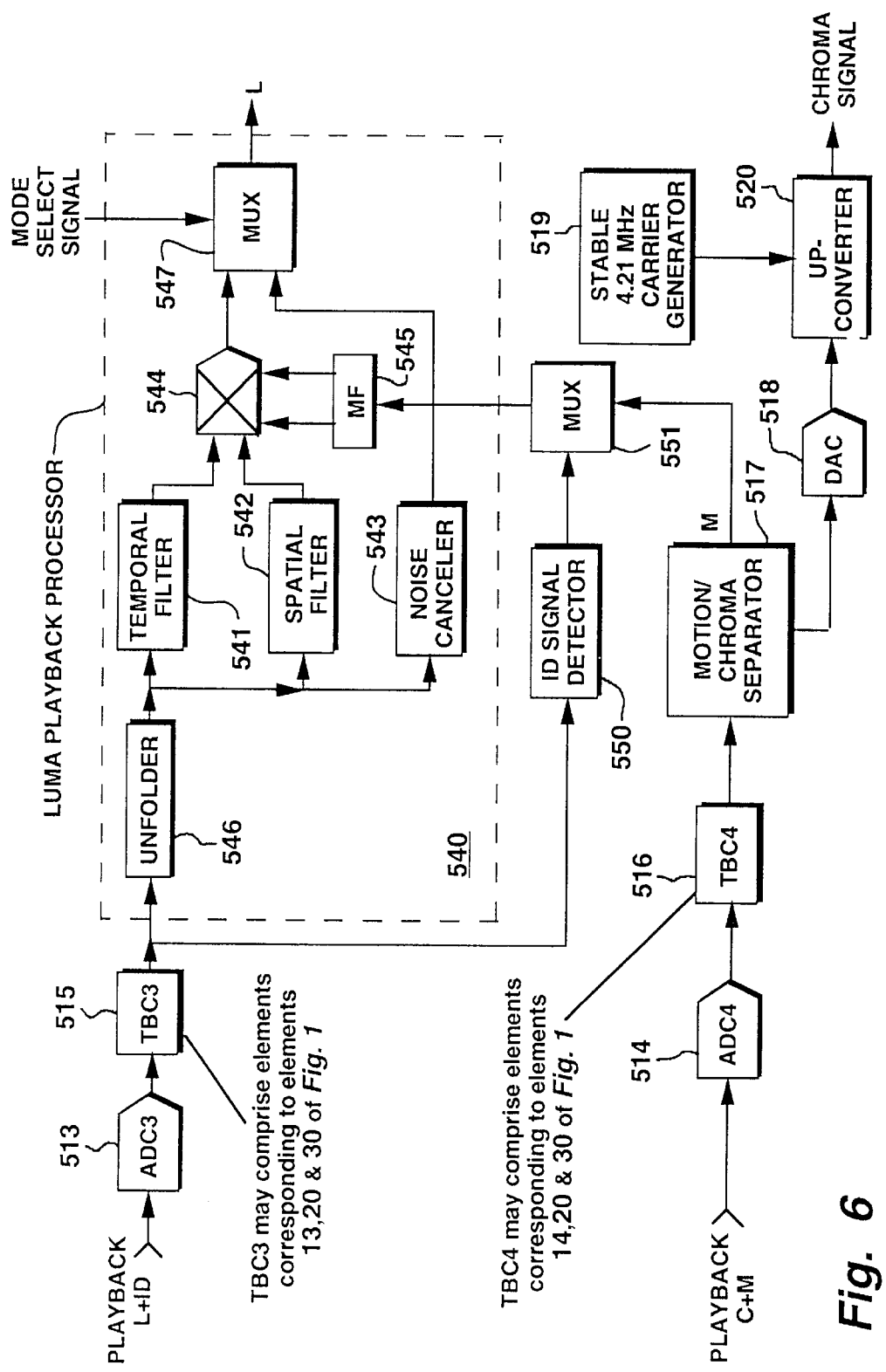
FIG. 6 is a schematic diagram of playback circuitry for use with the FIG. 1 video recording circuitry modified per FIG. 2, the playback circuitry embodies the invention in another of its aspects.

This impediment to luma/chroma tracking is removed in accordance with an aspect of the invention by applying a time-base correction to the digitized color-under signal supplied by the ADC 14 which corresponds to the time-base correction applied to the digitized luminance signal supplied by the ADC 13. The time-base correction of the digitized color-under signal is done by the FIFO memory 16, which receives the read addresses of the FIFO memory 15 as its write addresses and receives the write addresses of the FIFO memory 15 as its read addresses. The adverse effect that the time-base corrector TBC2 comprising elements 16, 20 and 30 tends to have on the synchronization of the local color oscillator in the color television receiver the video tape recording is played back for is compensated for in the playback electronics, as will be explained in detail further on in this specification when FIG. 6 is described in detail.

The time-base-corrected digitized color-under signal chroma is supplied from the FIFO memory 16 to the chroma recording processor 17. The chroma recording processor 17 limits the image response to input chroma signal, performs anti-crosstalk filtering to prevent crosstalk into the Fukinuki hole, which the motion signal M supplied from motion processor 47 is to occupy, and then supplies the final chroma signal C as one input signal of adder 18.

Figure 2:
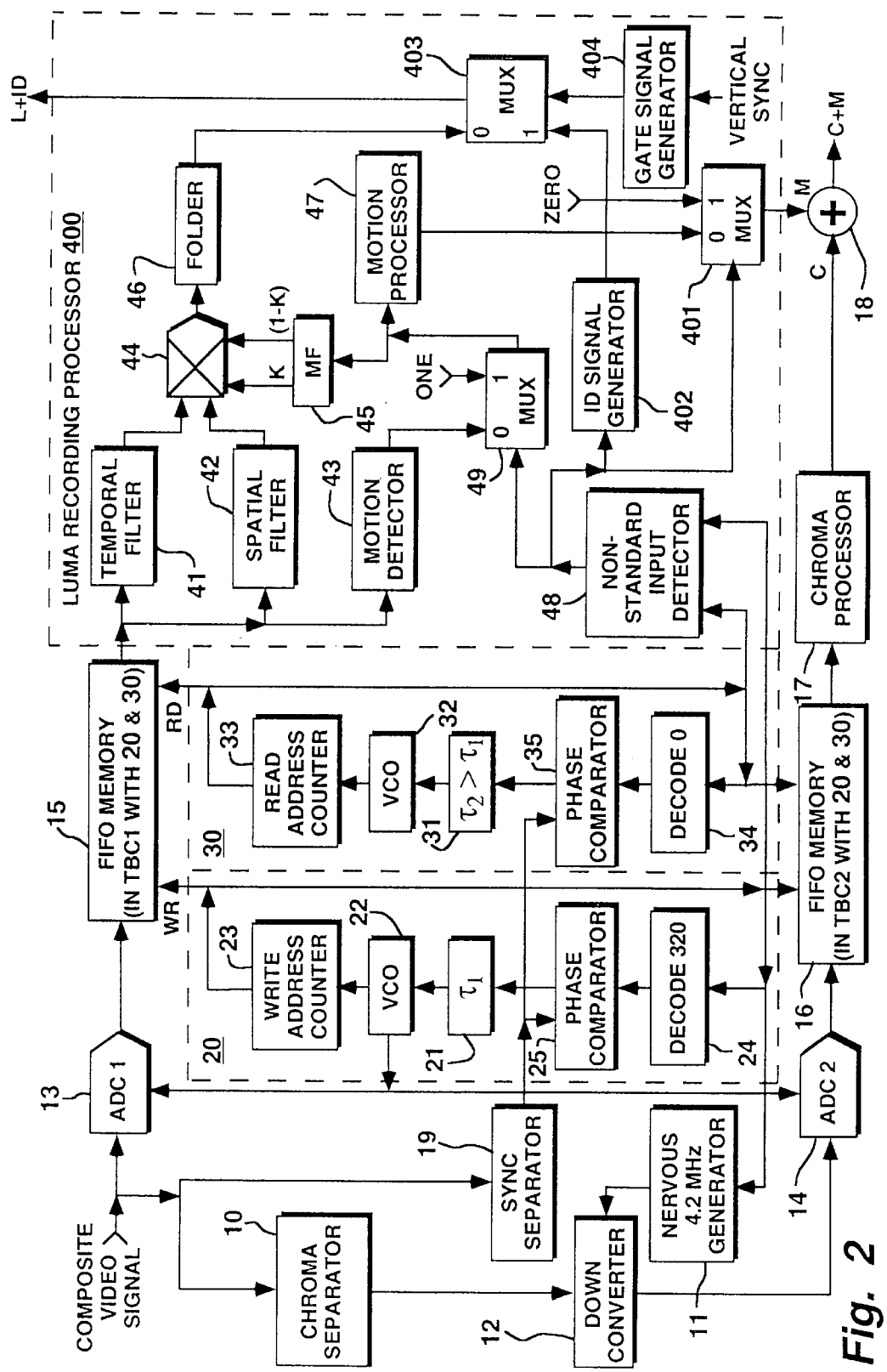
FIG. 2 is a schematic diagram of a modification that can be made to the FIG. 1 video recording circuitry to improve its performance in accordance with a further aspect of the invention.

FIG. 2 shows a modified luma recording processor 400 that can replace the luma recording processor 40 of the FIG. 1 recording circuitry, which includes in addition to the elements 41–49 of processor 40 further elements 401–404. The luma recording processor 400 responds to an input signal supplied for recording being classified as non-standard to set to zero the motion signal M supplied to the adder 18. This procedure is preferable to setting the motion signal M supplied to the adder 18 to full value in response to the input signal being classified as non-standard, as done in the FIG. 1 recording circuitry. This procedure is preferable because the motion signal M when full-valued tends to exhibit some undesired crosstalk into the color-under signal C. However, this procedure necessitates that some alternative way be provided for signaling the video tape playback circuitry that the recorded video signal is a non-standard one requiring its processing be carried out only in the two-dimensional spatial domain and not on a field-to-field or frame-to-frame basis in the time domain.

The multiplexer 401 is used to apply selectively the motion signal M from the motion processor 47 to the adder 18 when the non-standard input signal detector 48 classifies the video input signal received for recording to be standard, or substantially TBE-free, and supplies a logic ZERO to the multiplexer 401. When the non-standard input signal detector 48 classifies the video input signal received for recording to be non-standard and supplies a logic ONE to the multiplexer 401, the multiplexer 401 selectively applies arithmetic zero to the adder 18, rather than the motion signal M from the motion processor 47.

The ID signal generator 402 is of a type that generates an ID code capable of identifying the input signal as a non-standard signal by any known method, in response to the output signal from the non-standard input detector 48 being a ONE. For example, the ID code may be a succession of pseudo-noise pulse sequences when a non-standard video signal is to be recorded and black level or a different succession of pseudo-noise pulse sequences when a standard video signal is to be recorded. The multiplexer 403 receives the output signals of the folder 46 and the ID signal generator 402 as input signals and responds to the condition of a control signal supplied thereto from the gate signal generator 404 to select one of these input signals as the model on which to base its output signal. The gate signal generator 404 responds to a vertical sync signal to generate a gate signal that is applied to the multiplexer 403 as its control signal conditioning the multiplexer 403 to select its ID code input signal as the model on which to base its output signal during the active portion of a prescribed scan line during or immediately following the vertical blanking period. The multiplexer 403 supplies a time-multiplexed luma and ID signal L+ID to the remainder of the recording circuitry, which is conventional in nature.

Figure 3:
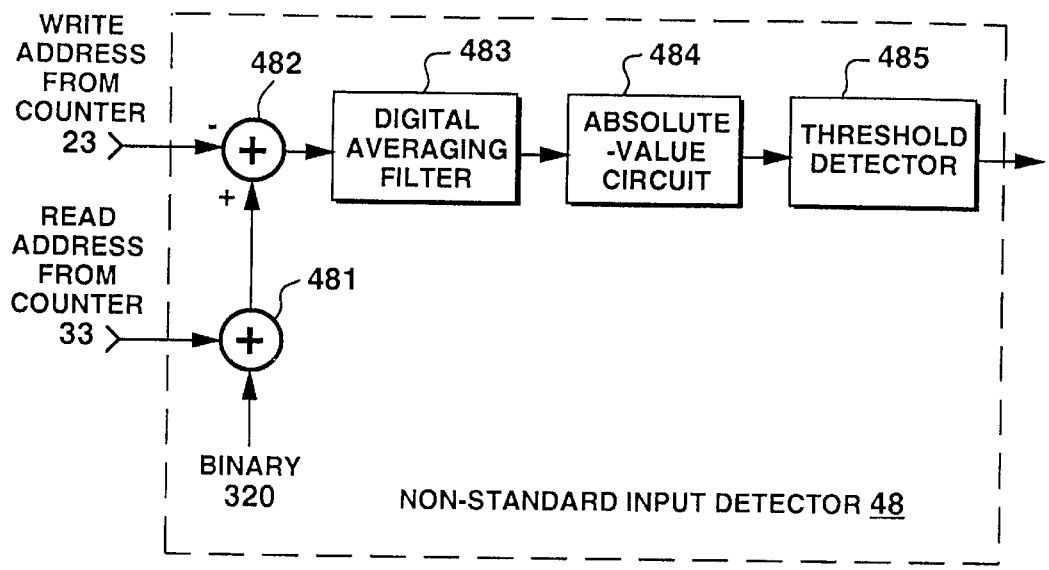
FIG. 3 is a schematic diagram of a non-standard input detector for determining whether video signals supplied for recording have too much time-base error to be adaptively spatio-temporally filtered as a step in the recording procedure, which detector is used as an element in the FIG. 1 and FIG. 2 video recording circuitry.

FIG. 3 shows in greater detail a possible structure for the non-standard input signal detector 48. A digital adder 481 adds binary 320 (half the 640 pixels in a scan line) to the read address supplied from counter 33 to generate a signal that in the absence of TBE should equal the write address supplied from counter 33 and that is differentially combined with the write address supplied from counter 33, using a digital subtractor 482. The subtractor 482 supplies its difference signal to a digital averaging filter 483 that averages over many samples. In its output signal an absolute value circuit 484 rectifies that average, which is applied as its input signal. The output signal of the absolute value circuit 484 is supplied to a threshold detector 485, which typically consists of a digital comparator. The threshold detector 485 generates a logic ONE output when a prescribed value is exceeded by the output signal of the absolute value circuit 484, which ONE indicates that the video input signal received for recording is classified as being non-standard. If the output signal of the absolute value circuit 484 does not exceed the prescribed value, the threshold detector 485 generates a logic ZERO output, which ZERO indicates that the video input signal received for recording is classified as being standard.

Figure 4:
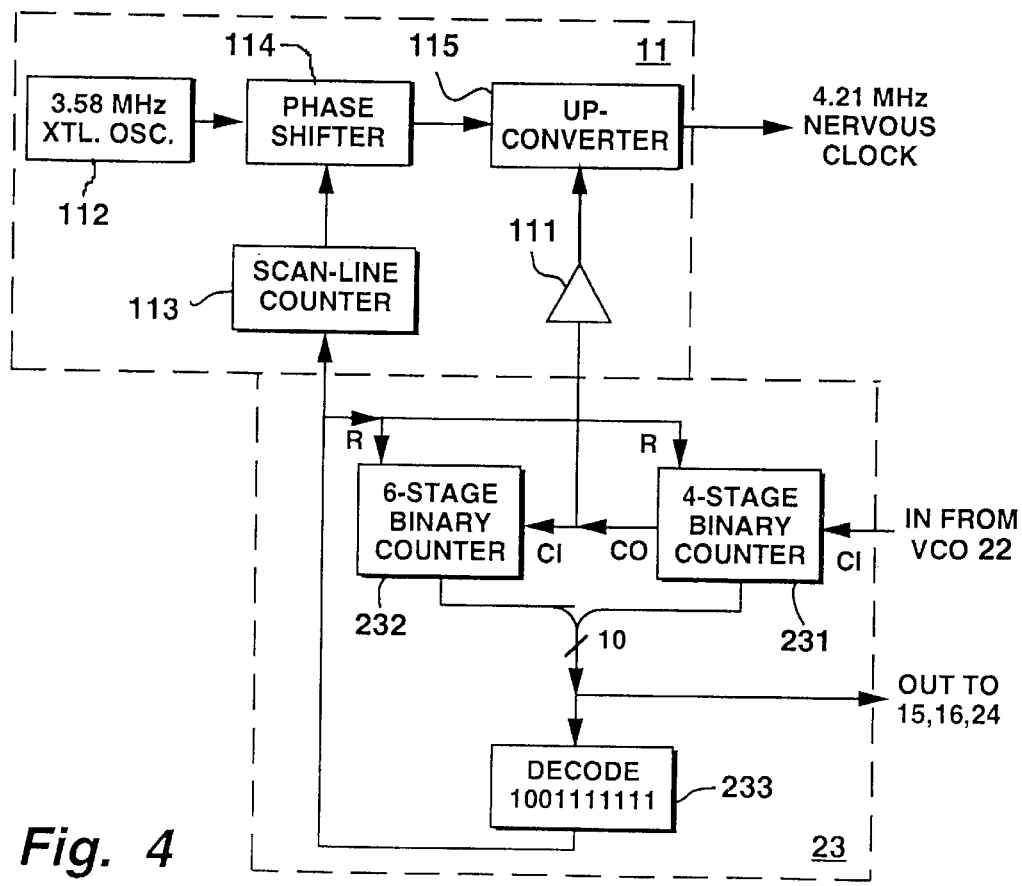
FIGS. 4 and 5 are each a schematic diagram of an alternative apparatus for generating a 4.21 MHz nervous clock in the FIG. 1 recording circuitry.

FIG. 4 shows one way to generate the nervous 4.21 MHz clock without having to have another phase-locked loop in addition to the phase-locked loop PLL1 in the write address generator 20. The write address counter 23 is shown in greater detail as comprising a four-stage binary counter 231 that counts 10.1 MHz oscillations supplied from the VCO 22 to its carry-in (CI) connection to generate a 629 kHz square wave at its carry-out (CO) connection, a six-stage binary counter 232 that counts that 629 kHz square wave supplied to its carry-in (CI) connection from the carry-out (CO) connection of four-stage binary counter 231, and a decoder 233 for responding to the combined counts of counters 231 and 232 to reset the combined counts to 00 0000 0000 after the combined counts reach 10 0111 1111.

The nervous clock generator 11 is shown in greater detail as comprising an amplifier 111 receiving as its input signal 629 kHz square wave from the carry-out (CO) connection of the counter 231, a crystal oscillator 112 for generating a very stable with time 3.58 MHz sine wave, a counter 113 for counting horizontal scan lines modulo-four, a programmable phase shifter 114 for shifting the 3.58 MHz sine wave in 90° steps in accordance with that modulo-four count, and an up-converting mixer 115 that generates the nervous 4.21 MHz clock frequency responsive to the sum frequency of the phase-shifted 3.58 MHz sine-wave oscillations from phase shifter 114 and the amplified 629 kHz output signal of the amplifier 111, which latter signal is "nervous" by reason of the shortness of the time constant $\tau_1$ of the phase-locked loop PLL1.

The programmable phase shifter 114 is used because there is to be a 90° incremental shift of 4.21 MHz from one horizontal scan line to the next during video recording. This provides for the desired 90° incremental shift of the 629 kHz color-under carrier from one horizontal scan line to the next during video recording. By way of example the programmable phase shifter 114 can comprise a tapped analog delay line for supplying 0°, 90°, 180° and 270° phases of 3.58 MHz sine wave and a multiplexer for selecting, in accordance with each modulo-four count of scan lines, a corresponding one of the four phases of 3.58 MHz sine wave as the output signal of the programmable phase shifter.

Figure 5:
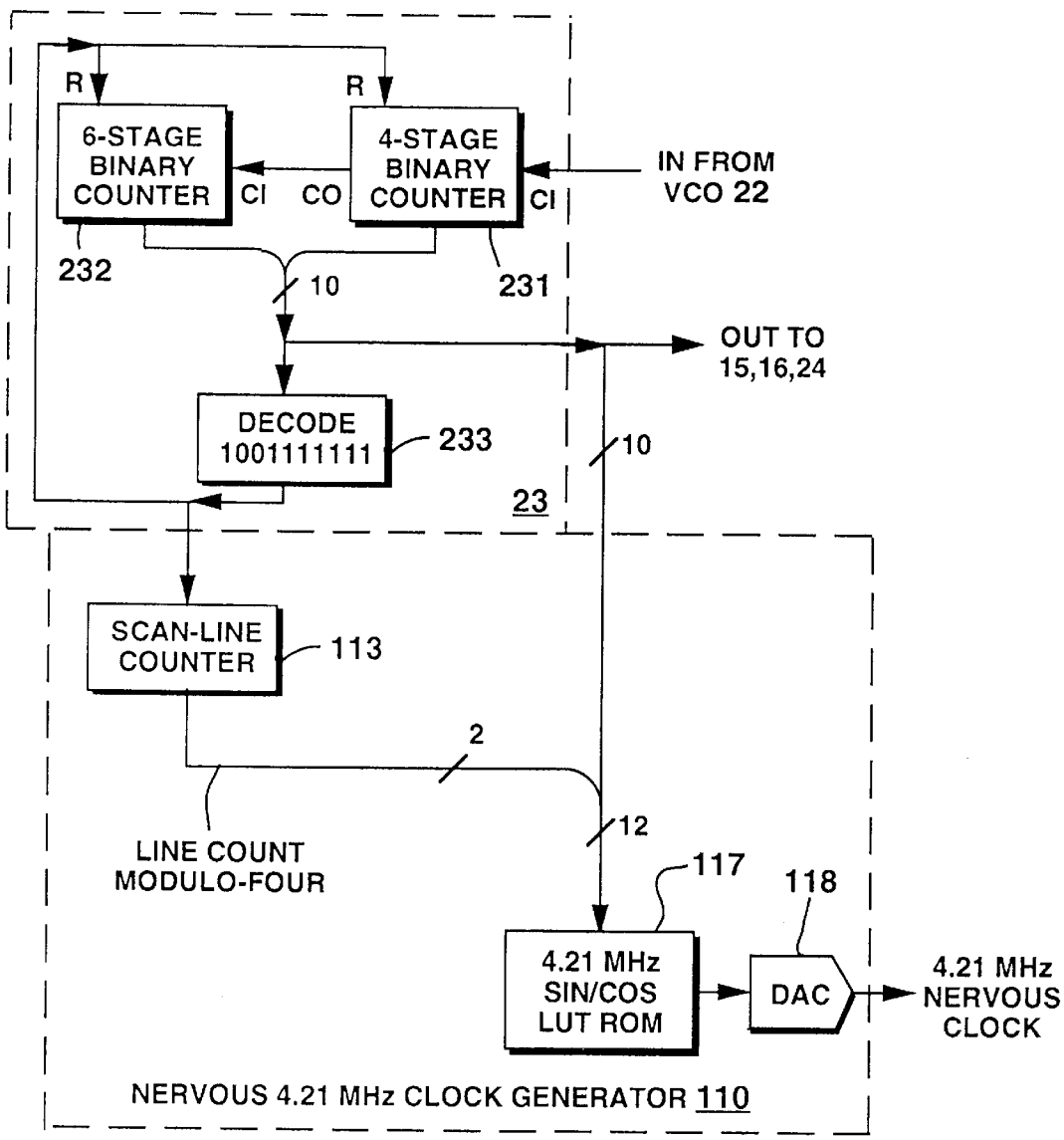

FIG. 5 shows another way to generate the nervous 4.21 MHz clock without having to have another phase-locked loop in addition to the phase-locked loop PLL1 in the write address generator 20. The nervous 4.21 MHz clock can be generated using a read-only memory 117 that stores sine-wave and cosine-wave look-up tables, a suitable one of which tables is selected for reading in accordance with the modulo-four count of horizontal scan lines. Since there is to be a 90° shift of 4.21 MHz from one horizontal scan line to the next during video recording, look-up from the sin/cos table is assumed to proceed on a four-scan-line cyclic basis. A digital-to-analog converter 118 converts the read-out signal from the ROM 117 to analog form for application to the down-converting mixer 12 of FIG. 1 or 2.

One skilled in the art of ROM look-up tables will discern that, rather than using a ROM 117 that stores two full scan lines of 4.21 MHz sine-wave and cosine-wave, advantage can be taken of symmetries of these functions over the two scan lines and of the similarities between the functions except for shift in time base to reduce ROM storage requirements. The three more-significant bits of the 12-bit write address can be used to control modification of the nine less-significant bits of the 12-bit write address to generate addresses for a ROM that stores half a scan line of the 4.21 MHz sin/cos function and to control selective negativing of the ROM output signal, in order to generate correctly phased 4.21 MHz carrier for each scan line. In the claims that are appended to this specification, such alternative arrangements are presumed to be within the scope of the term "read-only memory".

In FIGS. 4 and 5 the resets of the write-address counter 23 are shown being used as count input signal to the scan-line counter 113, which counter for the purposes of the invention needs only to be a two-stage binary counter for counting successive horizontal scan lines modulo-four. For other purposes, however, a multiple-stage binary counter 113 may be used for accumulating higher counts of successive scan lines or half-scan-lines, and two bits of the output signal of such a counter 113 may be used to provide the desired modulo-four count of scan lines used in FIG. 4 for controlling the programmable phase-shifter 114 and used in FIG. 5 for addressing the ROM storing the 4.21 MHz sin/cos look-up tables. Such a multiple-stage binary counter 113 should be of a type which counts horizontal scan lines over a two-frame cycle, so the counting of successive horizontal scan lines modulo-four progresses properly.

The FIG. 6 playback electronics receive a time-multiplexed L+ID signal recovered from the recording medium in accordance with prior art methods for recovering luma signals and a C+M color-under signal encoding chroma and motion signal C+M recovered from the recording medium in accordance with prior art methods for recovering color-under signals. The analog L+ID and C+M signals are digitized by a third analog-to-digital converter (ADC3) 513 and by a fourth analog-to-digital converter (ADC4) 514, respectively, which are similar in construction to the first analog-to-digital converter (ADC1)13 and to the second analog-to-digital converter (ADC2)14. The digitized L+ID signal is supplied to a third time-base corrector 515 (TBC3), which is similar in construction to the first time-base corrector 15 (TBC1). The digitized C+M signal is supplied to a fourth time-base corrector 516 (TBC4), which is similar in construction to the second time-base corrector 16 (TBC2). Accordingly, switching arrangements (not shown) can be provided for using elements 13–16 during playback as the elements 513–516, rather than using separate elements 513–516.

The luma reproducing circuitry comprises the third analog-to-digital converter 513 (ADC3), the third time-base corrector 515 (TBC3), a luma playback processor 540, an ID signal detector 550, and a multiplexer 551. Through appropriate switching arrangements (not shown), during playback the luma playback processor 540 can use elements which during recording are used in the luma recording processor 40. The ADC3 513 digitizes the reproduced luma and ID signal L+ID, and TBC3 515 performs TBE correction to the resulting digitized signal. The ID signal detector 550 identifies whether or not the luma signal of one field to be reproduced is a non-standard signal by detecting the recorded ID signal. If and only if the reproduced luma signal is a non-standard signal, the ID signal detector 550 generates a control signal that conditions the multiplexer 551 to apply arithmetic one (the presumed full value of the motion signal M) to the luma playback processor 540 for conditioning processor 540 to generate an output signal L just by spatial processing.

Luma playback processor 540 includes an unfolder 546 which restores the bandwidth-compressed luma signal by frequency-unfolding it to its original bandwidth and re-emphasizing its de-emphasized higher frequencies (which reemphasis is preferably done adaptively as particularly described in U.S. patent application Ser. No. 07/569, 029), temporal filter 541 and spatial filter 542 for eliminating a folding carrier and an undesired image sideband, a noise canceler 543 which improves the image quality when reproducing signal recorded by a conventional VHS system, a soft switch 544, a motion factor generator 545, and a multiplexer 547. The multiplexer 547 reproduces as is its own output signal one of the output signals from soft switch 544 and noise canceler 543 supplied to the multiplexer 547 as its input signals, as selected by a mode select signal that specifies the kind of the video signal that is being played back from the tape, i.e., whether it is a normal VHS system or a bandwidth compression system. The motion factor generator 545 performs the same operation as the aforesaid motion factor generator 45 of the luma recording processor 400 in response to the input signal of the ID signal detector 550.

The chroma reproducing circuitry comprises the fourth analog-to-digital converter 514 (ADC4), the fourth time-base corrector 516 (TBC4), a motion/chroma separator 517, a digital-to-analog converter 518, a four-phase stable 4.21 MHz carrier generator 519 and an up-converter 520. The ADC4 514 digitizes the reproduced motion and chroma signal, and the TBC4 516 corrects the TBE during the reproduction of the digitized signal. The motion/chroma separator 517 separates the motion signal and the chroma signal, and supplies the motion signal to the 551 multiplexer for selective application to the motion factor generator 545. The separated chroma signal is converted to analog form by the digital-to-analog converter 518 for application as input signal to the up-converter 520, to be up-converted in frequency from 629 KHz to 3.58 MHz in accordance with a stable 4.21 MHz clock signal supplied by the 4.21 MHz carrier generator 519. The generator 519 supplies a four-phase 4.21 MHz stable clock with phase change from one horizontal scan line to the next during playback. These shifts of phase heterodyne with the phase shifts of the 629 kHz color-under carrier from one horizontal scan line to the next, as introduced during video recording, so these phase shifts cancel out in the regenerated 3.58 MHz chroma sidebands supplied from the up-converting mixer 520. Accordingly, the line-to-line changes in the carrier phasing of the regenerated 3.58 MHz chroma sidebands supplied from the mixer 520 replicate the line-to-line changes in the carrier phasing of the 3.58 MHz chroma sidebands in the composite signal originally supplied for recording.

The regenerated 3.58 MHz chroma sidebands supplied from the mixer 520 are additively combined with the luminance signal L supplied from the multiplexer 547 in circuitry subsequent to that shown in FIG. 6. There are customarily steps of filtering that precede this step of additive combining to regenerate a composite video signal. This composite video signal is rejoined with a modulated sound carrier and then used to modulate a low-level radio-frequency carrier. The modulated r-f carrier is suitable for application to a color television receiver.

Figure 7:
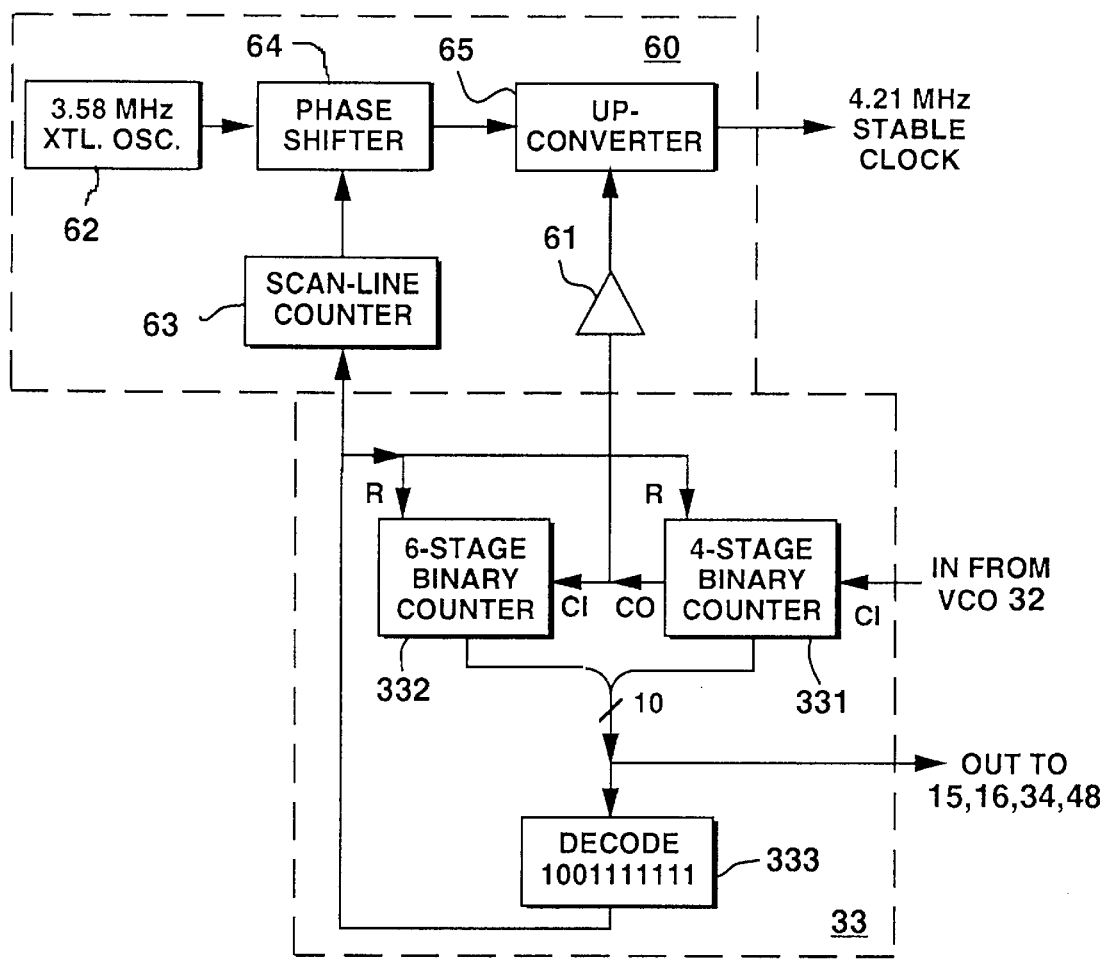
FIGS. 7, 8 and 9 are each a schematic diagram of an apparatus for generating a 4.21 MHz stable clock in the FIG. 6 playback circuitry.

FIG. 7 shows one form the stable 4.21 MHz generator 519 of FIG. 6 may take, assuming that the time-base corrector TBC4 used during playback employs the same read address generator 30 used for time-base corrector TBC2 during recording. The read address generator 30 includes the read address counter 33. The read address counter 33 is shown in greater detail as comprising a four-stage binary counter 331 that counts 10.1 MHz oscillations supplied from the VCO 32 to its carry-in (CI) connection to generate a 629 kHz square wave at its carry-out (CO) connection, a six-stage binary counter 332 that counts that 629 kHz square wave supplied to its carry-in (CI) connection from the carry-out (CO) connection of four-stage binary counter 331, and a decoder 333 for responding to the combined counts of counters 331 and 332 to reset the combined counts to 00 0000 0000 after the combined counts reach 10 0111 1111.

The 4.21 MHz stable clock generator 60 is shown in greater detail as comprising an amplifier 61 receiving as its input signal 629 kHz square wave from the carry-out (CO) connection of the counter 331, a crystal oscillator 62 for generating a very stable with time 3.58 MHz sine wave, a counter 63 for counting horizontal scan lines modulo-four, a programmable phase shifter 64 for shifting the 3.58 MHz sine wave in 90° steps in accordance with that modulo-four count, and an up-converting mixer 65 that generates the stable 4.21 MHz clock frequency responsive to the sum frequency of the phase-shifted 3.58 MHz sine-wave oscillations from phase shifter 64 and the amplified 629 kHz output signal of the amplifier 61, which latter signal is "stable" by reason of the length of the time constant $\tau_2$ of the phase-locked loop PLL2. The programmable phase shifter 64 is used to introduce the phase shifts of the 4.21 MHz stable clock from one horizontal scan line to the next during playback that heterodyne with the phase shifts of the 629 kHz color-under from one horizontal scan line to the next, as introduced during video recording, so these phase shifts compensate for each other in the up-converting mixer 520 output signal.

Figure 8:
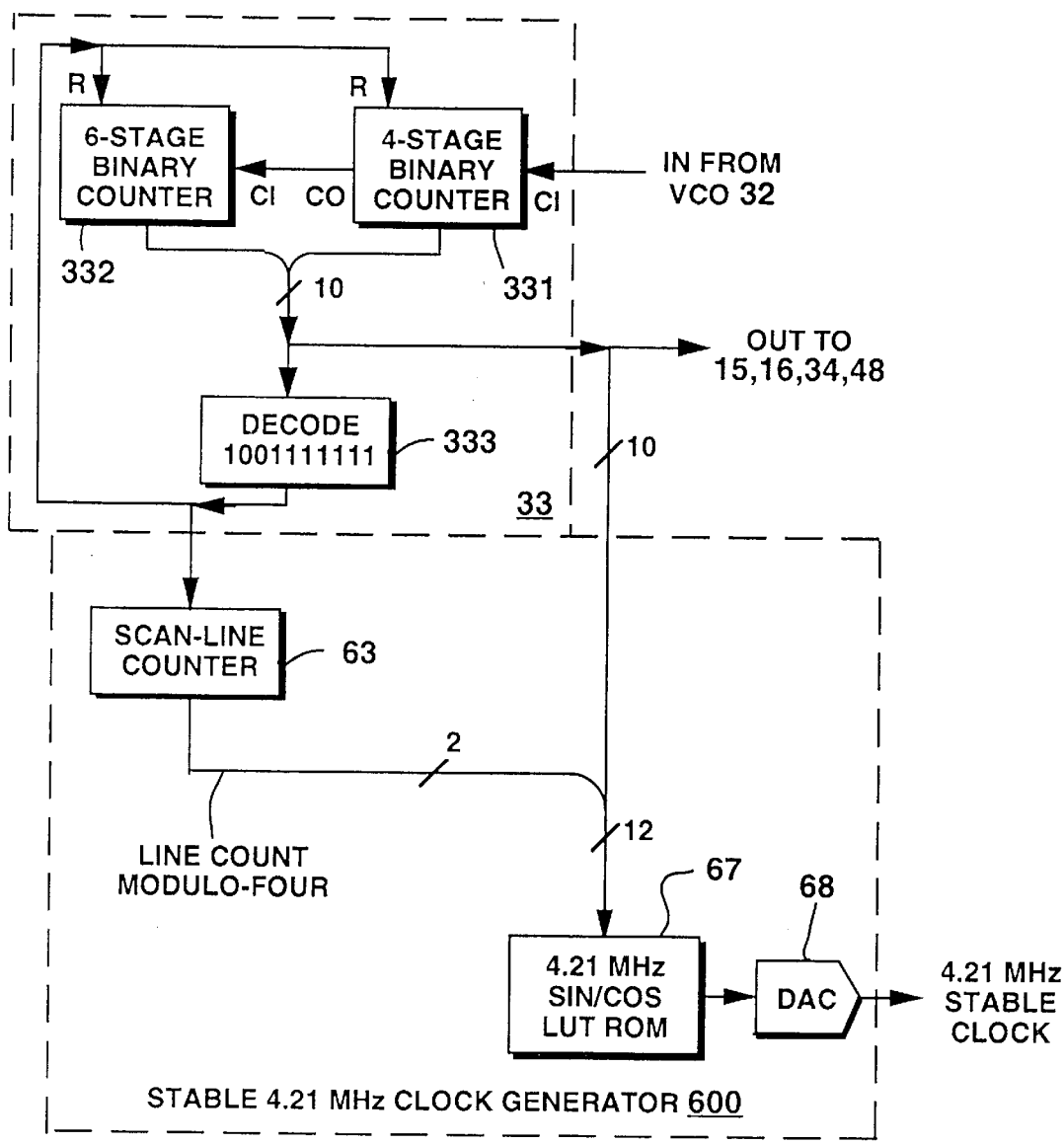

FIG. 8 shows another form the stable 4.21 MHz generator 519 of FIG. 6 may take, again assuming that the time-base corrector TBC4 used during playback employs the same read address generator 30 used for time-base corrector TBC2 during recording. The read address counter 33 is assumed to have substantially the same structure as described in regard to FIG. 7. The scan-line counter 63 is assumed to have substantially the same structure as described in regard to FIG. 7, also. A read-only memory 67 stores sine-wave and cosine-wave look-up tables, and a digital-to-analog converter 68 converts the read-out signal from the ROM 67 to analog form for application to the up-converting mixer 520 of FIG. 6. The tables in ROM 67 are sequentially selected for reading, this selection being in accordance with the modulo-four count of horizontal scan lines supplied from the scan-line counter 63. This selection is such as to introduce phase shifts of the 4.21 MHz stable clock from one horizontal scan line to the next during playback that heterodyne with the phase shifts of the 629 kHz color-under from one horizontal scan line to the next, as introduced during video recording, so these phase shifts cancel out in the 3.58 MHz chroma sidebands supplied from the up-converting mixer 520.

Figure 9:
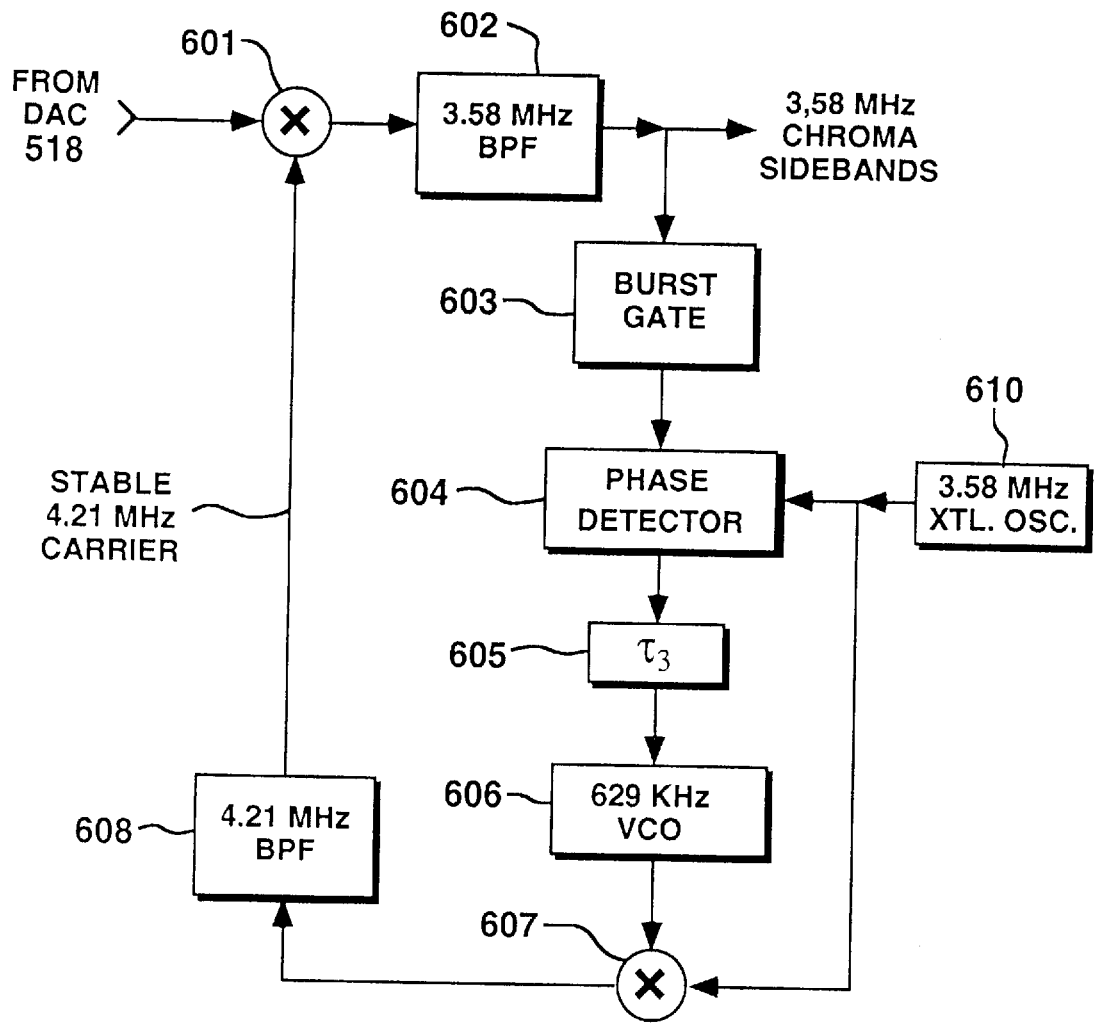

FIG. 9 shows still another form the stable 4.21 MHz generator 519 of FIG. 6 may take, which form is similar to that used in prior-art VHS home video recorder playback electronics. While not as simple as the stable 4.21 MHz generators of FIGS. 7 and 8, fast-forward, frame-freeze and other modes of trick play are better accomodated. The analog color-under signal from the digital-to-analog converter 518 and the four-phase 4.21 MHz stable clock being generated are heterodyned in a mixer 601. The resulting 3.58 MHz sidebands, with phasing suitable to a composite video signal, are separated by a band-pass filter 602 that suppresses the higher-in-frequency image signal. A burst gate 603 selects the color burst from the resulting 3.58 MHz sidebands to a synchronous phase-detector 604, which detects the error of the separated burst from the 3.58 MHz oscillations supplied from a crystal oscillator 610. (Because 3.58 MHz crystals are so widely used in color television receivers, they are relatively inexpensive and 3.58 MHz oscillations are commonly used as a time-base reference for the servomechanism that controls tape speed.) The error signal is passed through a low-pass filter 605 with a time constant $\tau_3$ of the order of several pixel durations and is then applied as control signal to a voltage-controlled 629 kHz oscillator 606, which reproduces the four-phase carrier of the color-under signal. The four-phase 629 kHz oscillations supplied by the oscillator 606 and the single-phase 3.58 MHz oscillations from the crystal oscillator 610 are heterodyned in a mixer 607 to generate four-phase 2.95 MHz and 4.21 MHz carriers. A band-pass filter 608 selects the four-phase 4.21 MHz carrier as the 4.21 MHz stable clock for application to the mixer 601. The action of the degenerative feedback loop as formed by interconnecting elements 601–608 is such as to remove during playback, both from the 3.58 chroma sidebands and the accompanying color bursts, the line-to-line phase modulation added during video recording.

Figure 10:
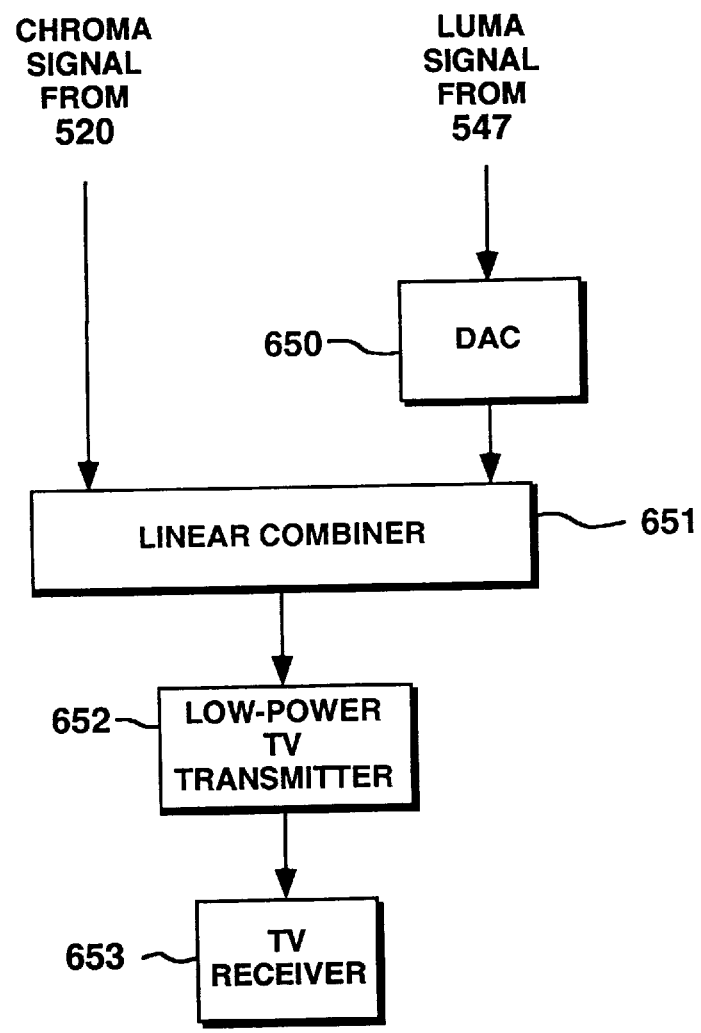
FIG. 10 is a schematic diagram of prior-art circuitry for generating a low-level television signal responsive to the luma and chroma signals recovered by the FIG. 6 playback circuitry.

FIG. 10 depicts prior-art apparatus for generating a low-level television signal responsive to signals from the FIG. 6 playback circuitry. The playback luminance signal L from the multiplexer 547 in FIG. 6 is supplied to a digital-to-analog converter 650 in FIG. 10 to be converted from digital to analog form, the sampling by the converter 650 being in accordance with a stable clock, such as that used to time the output samples from the time-base corrector 515 in FIG. 6. The resulting analog luminance signal and the chroma signal from the up-converter 520 in FIG. 6 are summed together in a linear combiner 651. The linear combiner 651 may be a simple analog signal summation circuit, such as a resistor matrix, by way of example. The resulting frequency-multiplexed signal is supplied to a low-power television transmitter 652 to govern the amplitude modulation of a low-power television picture carrier wave in accordance with the frequency-multiplexed signal from the linear combiner 651. To save cost in the transmitter 652, balanced amplitude modulation with partially suppressed picture carrier may be used, rather than vestigial amplitude modulation. Arrangements (not shown in the drawing) are provided to derive television sound signal from signals played back from the video recording tape and to supply the television sound signal to the low-power television transmitter 652 to govern the frequency-modulation of a television sound carrier wave. The low-power television transmitter 652 customarily supplies its radio-frequencies to the antenna connections of a television receiver 653.

Figure 11:
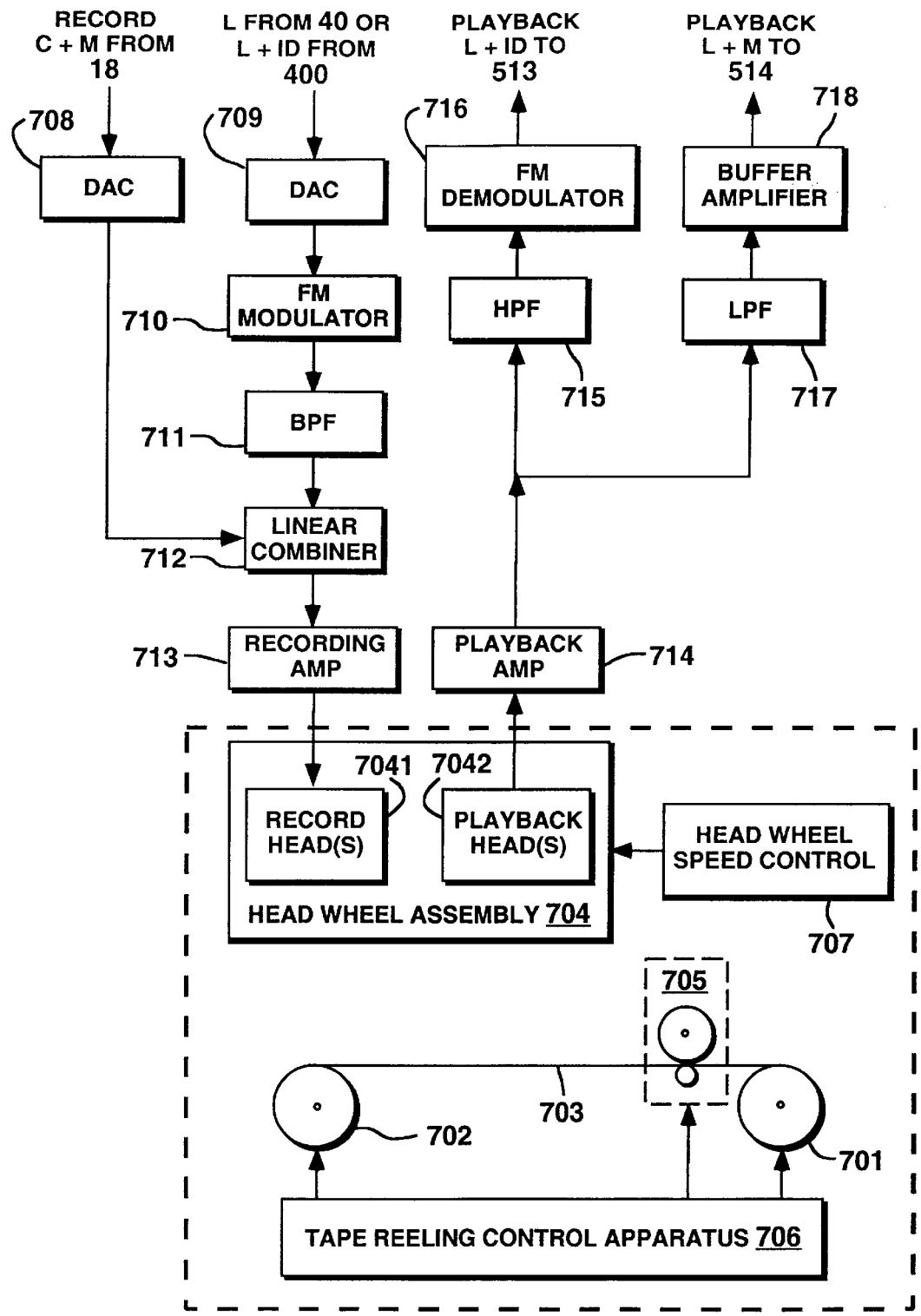
FIG. 11 is a schematic diagram of prior-art VHS record/playback apparatus with which the circuitry of FIGS. 1–9 is associated.

FIG. 11 depicts prior-art VHS record/playback apparatus, so that all elements referred to in the claims following this specification are shown in the drawing. A tape-transport 700 has a supply reel 701 and a take-up reel 702 for spooling a video recording tape 703 past a head wheel assembly 704 at a speed controlled by at least a first driven-capstan unit 705 under the control of tape reeling control apparatus 706. In a single-motor tape-transport the supply reel 701 and take-up reel 702 are driven by the same motor as the driven-capstan unit 705 with mechanical linkages providing the adjustments of reel speeds necessary during the course of spooling tape 703 past the head wheel assembly 704. In more expensive tape-transports the supply reel 701 and take-up reel 702 may be provided separate motors under electrical control from the tape reeling control apparatus 706. The headwheel assembly 704, which includes record head(s) 7041 and playback head(s) 7042, rotates in a direction at an angle with tape spooling past the headwheel assembly. The speed of a motor rotating the headwheel in the headwheel assembly 704 is under control of headwheel speed control circuitry 707, which typically includes a number of servo-mechanisms for adjusting the speed of headwheel rotation during recording and during playback.

During recording, the composite chroma/motion signal C+M supplied from the adder 18 of the FIG. 1 or FIG. 2 recording electronics is converted to analog form by a digital-to-analog converter 708. The luminance signal L from the luma recording processor 40 of FIG. 1 or the luminance and identification signal L+ID from the luma recording processor 400 of FIG. 2 is converted to analog form by a digital-to-analog converter 709, thereafter to be applied as modulating signal to a frequency modulator 710. The converters 708 and 709 each include respective low-pass filtering of its output signal (not shown) to suppress conversion artifacts. The resulting frequency-modulated luminance carrier is supplied by the frequency modulator 710 as input signal to a band-pass filter 711, the response of which is restricted to a 1.4–5.9 MHz band above the band occupied by the C+M signal supplied from the digital-toanalog converter 708. The response of the band-pass filter 711 and the C+M signal supplied from the digital-to-analog converter 708 are combined in a linear combiner 712 to form a frequency-multiplexed signal for application to a recording amplifier 713. The linear combiner 712 may be a simple analog signal summation circuit, such as a resistor matrix, by way of example. The recording amplifier 713 applies recording equalization to the combined signal and applies the resulting signal to the recording head(s) 7041 in the headwheel assembly 704.

During playback, a playback amplifier 714 responds to combined signal recovered from the playback head(s) 7042 in the headwheel assembly 704 to generate a combined signal from which recording equalization has been removed. This flat-response combined signal is supplied to a high-pass filter 715, which separates the frequency-modulated luminance carrier in the 1.4–5.9 MHz band for application to a frequency-modulation demodulator 716. The demodulator 716 recovers luminance signal L or luminance and recording-mode identification signal L+ID for application to the analog-to-digital converter 513 of FIG. 6. The flat-response combined signal from the playback amplifier 714 is also supplied to a low-pass filter 717, which separates the C+M signal. A buffer amplifier 718 is shown for terminating the low-pass filter 717 and for applying the separated C+M signal to the analog-to-digital converter 514 of FIG. 6.

A number of variants in the design of the phase-locked loops are known to those skilled in the art of their design and may be employed in alternative embodiments of the invention. As an example, the address counter output is in effect a digitized sawtooth wave which may be latched responsive to a recurring edge of the horizontal synchronizing pulses to generate an error signal for the VCO having its oscillations counted by the address counter. As a further example, the foregoing type of phase-locked loop may be modified to use the digitized sawtooth wave from the address counter to address a read-only memory storing a steeper slope discriminator characteristic that is latched responsive to a recurring edge of the horizontal synchronizing pulses to generate an error signal for the VCO having its oscillations counted. As a still further example, the digital discriminator response may be converted to analog form and the horizontal synchronizing pulses may used to gate the analog discriminator response to generate an error signal for the VCO having its oscillations counted. Other variants in the design of the phase-locked loops are known.

The mixers 12 and 520 have each been shown as being the type in which the difference of the heterodyned signals is selected by the mixer output filtering to be the output signal of the mixer. Mixers of the type in which the sum of the heterodyned signals is selected by the mixer output filtering instead are used in other video recorder/playback systems embodying the precepts of the invention, the 4.21 MHz carriers being replaced with 2.95 MHz carriers.

Video tape recorders in which the generation of the color-under signals is carried out completely in the digital regime or substantially so may embody the invention in its broader aspects. While the TBC of separately recorded luma and chroma signals has been described with specific reference to the processing of folded-spectrum luma signals, the principles of the invention in regard to the TBC of separately recorded luma and chroma signals has general application in video recorder/playback systems in which digital processing of the luma signal, or of the chroma signal, or of both the luma and the chroma signals is carried out and requires time-base stability.

What is claimed:
1. A video signal processing circuit, comprising:
  means for receiving video signals containing synchronizing signals, chrominance signals and luminance signals for recording;
  synchronization separator means for separating said synchronizing signals contained in said video signals from said video signals;
  chroma separator means for separating chrominance signals contained in said video signals from said video signals;
  time base correction means having a first-in/first-out storage device for performing time base correction on said video signals and said chrominance signals, and providing time-base corrected video signals and time-base corrected chrominance signals in dependence upon said synchronizing signals;
  chroma processor means for processing said time-base corrected chrominance signals for recording; and
  luminance processor means for processing said time-base corrected luminance signals contained in said time-base corrected video signals for recording.
2. The video signal processing circuit of claim 1, wherein said time base correction means comprises:
  write address generating means for generating write addresses in response to said synchronizing signals;
  read address generating means for generating read addresses; and
  said first-in/first-out storage device for temporarily storing said video signals in response to said write addresses and providing said time-base corrected video signals in response to said read addresses.
3. The video signal processing circuit of claim 2, wherein said write addresses are generated in response to horizontal synchronization pulses contained in said synchronizing signals, and said read addresses are generated in response to vertical synchronization signals contained in said synchronizing signals.
4. The video signal processing circuit of claim 2, wherein said first-in/first-out storage device comprises:
  a first first-in/first-out memory connected to receive said video signals; and
  a second first-in/first-out memory connected to receive said chrominance signals.
5. The video signal processing circuit of claim 2, wherein said write address generating means comprises a first phase locked loop having a first loop time constant substantially equal to a duration of a horizontal scan line.
6. The video signal processing circuit of claim 5, wherein said read address generating means comprises a second phase locked loop having a second loop time constant substantially longer than a duration of said horizontal scan line.
7. The video signal processing circuit of claim 6, wherein said second loop time constant is approximately twenty times longer than said duration of said horizontal scan line.
8. The video signal processing circuit of claim 2, wherein said write address generating means comprises:
  a write address counter for providing said write addresses in response to first oscillation signals;
  a first decoder for decoding said write addresses and providing first decoder signals indicative of receipt of a specified one of said write addresses;
  a first comparator for generating first error signals indicative of comparisons between said synchronizing signals and said first decoder signals;

a first low pass filter having a first time constant, for filtering said first error signals; and means for generating said first oscillation signals, oscillating at a frequency higher than said synchronizing signals, and having a phase controlled by said first error signals filtered by said first low pass filter.

9. The video signal processing circuit of claim 8, wherein said first time constant is substantial equal to a duration of a horizontal scan line.

10. The video signal processing circuit of claim 8, further comprising:

a first analog to digital converter for digitizing said video signals in response to said first oscillation signals;

a down converter for generating color-under chrominance signals in response to said chrominance signals; and a second analog to digital converter for digitizing said color-under chrominance signals generated by said down converter in response to said first oscillation signals.

11. The video signal processing circuit of claim 8, wherein said read address generating means comprises:

a read address counter for providing said read addresses in response to second oscillation signals;

a second decoder for decoding said read addresses and providing second decoder signals indicative of receipt of a specified one of said read addresses;

a second comparator for generating second error signals indicative of comparisons between said synchronizing signals and said second decoder signals;

a second low pass filter having a second time constant, for filtering said second error signals; and means for generating said second oscillation signals, oscillating at a frequency higher than said synchronizing signals, and having a phase controlled by said second error signals filtered by said second low pass filter.

12. The video signal processing circuit of claim 11, wherein said second time constant is substantially longer than a duration of said horizontal scan line.

13. The video signal processing circuit of claim 4, further comprising:

a first analog to digital converter for digitizing said video signals received by said first first-in/first-out memory;

a nervous carrier generator for generating nervous carrier signals;

a down converter for generating color-under chrominance signals in response to said nervous carrier signals and said chrominance signals; and a second analog to digital converter for digitizing said color-under chrominance signals generated by said down converter and providing the digitized color under signals as said chrominance signals received by said second first-in/first-out memory.

14. The video signal processing circuit of claim 1, wherein said luminance processor means comprises:

a temporal filter for generating first luminance signals by frame comb filtering said time-base corrected video signals provided by said time base correction means;

a spatial filter for generating second luminance signals by line comb filtering said time-base corrected video signals provided by said time base correction means;

a motion detector for generating motion signals indicative of motion in said time-base corrected video signals provided by said time base correction means;

a motion factor generator for generating motion factors in response to said motion signals; and a soft switch for generating output luminance signals by mixing said first luminance signals and said second luminance signals in response to said motion factors.

15. The video signal processing circuit of claim 14, wherein said luminance processor means further comprises:

a non-standard input detector for generating non-standard input signals indicative of said video signals having time base error greater than a threshold level; and a multiplexer for selectively providing one of said motion signals and a fixed value to said motion factor generator in response to said non-standard input signals.

16. The video signal processing circuit of claim 15, wherein said non-standard input detector detects said time base error by comparing said read addresses and said write addresses.

17. The video signal processing circuit of claim 14, wherein said luminance processor means further comprises a motion processor for modulating said motion signals to interleave with said time-base corrected chrominance signals generated by said chroma processor means.

18. The video signal processing circuit of claim 17, wherein said luminace processor means modulates said motion signals onto a four phase carrier so as to have sidebands each falling into a Fukinuki hole.

19. The video signal processing circuit of claim 17, further comprising an adder for combining the modulated motion signals and said time-base corrected chrominance signals generated by said chroma processor means.

20. The video signal processing circuit of claim 1, wherein said luminance processor means comprises:

a temporal filter for generating first luminance signals by frame comb filtering said time-base corrected video signals provided by said time base correction means;

a spatial filter for generating second luminance signals by line comb filtering said time-base corrected video signals provided by said time base correction means;

a motion detector for generating motion signals indicative of motion in said time-base corrected video signals provided by said time base correction means;

a motion factor generator for generating motion factors in response to said motion signals;

a soft switch for generating output luminance signals by mixing said first luminance signals and said second luminance signals in response to said motion factors;

a non-standard input detector for generating non-standard input signals indicative of said video signals having time base error greater than a threshold level;

a first multiplexer for selectively setting said motion signals received by said motion factor generator to a first fixed value in response to said non-standard input signals;

a motion processor for modulating said motion signals to interleave with said time-base corrected chrominance signals generated by said chroma processor means;

an adder for combining the modulated motion signals and said time-base corrected chrominance signals generated by said chroma processor means;

a second multiplexer for selectively setting said modulated motion signals received by said adder to a second fixed value in response to said non-standard input signals; and means for generating identification signals, to be combined with said output luminance signals, indicative of said video signals having time base error greater than said threshold value.

21. The video signal processing circuit of claim 13, wherein said nervous carrier generator comprises:
   a stable oscillator for generating a stable sinusoidal signal; and
   a up-converting mixer for generating said nervous carrier signals by mixing said stable sinusoidal signal with counter signals generated by said write address generating means.

22. The video signal processing circuit of claim 13, wherein said nervous carrier generator comprises a sinusoid look up table generating said nervous carrier signals addressed by counter signals generated by said write address generating means.

23. A video signal processing circuit, comprising:
   time base correction means having a first-in/first-out storage device, for performing time base correction on video signals regenerated by temporarily storing and then providing time-base corrected video signals in response to synchronizing signals;
   unfolding means for generating restored bandwidth luminance signals from said time-base corrected video signals provided by said time base correction means;
   luminance processor means for processing said restored bandwidth luminance signals;
   chroma/motion separator means for separating motion signals and chrominance signals from said time-base corrected video signals provided by said time base correction means;
   up-converting means for up converting said chrominance signals generated by said chroma/motion separator means in accordance with a sinusoidal clock; and
   sinusoidal generator means comprising an oscillator for generating stable sinusoidal signals, and an up-converting mixer for generating said sinusoidal clock by mixing said stable sinusoidal signals with predetermined counter signals.

24. The video signal processing circuit of claim 23, wherein said luminance processor means comprises:
   temporal filter for generating first luminance signals by frame comb filtering said time-base corrected video signals provided by said time base correction means;
   a spatial filter for generating second luminance signals by line comb filtering said time-base corrected video signals provided by said time base correction means;
   a motion factor generator for generating motion factors in response to said motion signals; and
   a soft switch for generating output luminance signals by mixing said first luminance signals and said second luminance signals in response to said motion factors.

25. The video signal processing circuit of claim 24, further comprising means for detecting identification signals contained in said video signals and setting said motion signals received by said motion factor generator to a fixed value in response to detection of said identification signals, said identification signals being indicative of time base error in said video signals during recordation.

26. The video signal processing circuit of claim 23, wherein said sinusoidal generator means further comprises a sinusoid look up table for generating said sinusoidal clock.

27. The video signal processing circuit of claim 23, wherein said up-converting means comprises:
   a first mixer for multiplying said chrominance signals generated by said chroma/motion separator means by a stable sinusoidal carrier;
   a first bandpass filter for filtering products generated by said first mixer;
   a burst gate for isolating a color burst contained in said products;
   a comparator for generating comparisons between said color burst and a stable oscillator signal;
   a lowpass filter for filtering said comparisons;
   a voltage controlled oscillator for generating four phase oscillations in response to the filtered comparisons;
   a second mixer for heterodyning said four phase oscillations; and
   a second bandpass filter for generating said stable sinusoidal carrier by filtering said four phase oscillations heterodyned by said second mixer.

28. The video signal processing circuit of claim 23, wherein said time base correction means comprises:
   a write address generator for generating write addresses;
   a read address generator for generating read addresses; and
   said first-in/first-out storage device for temporarily storing said video signals in response to said write addresses and providing the stored video signals in response to said read addresses.

29. The video signal processing circuit of claim 28, wherein said first-in/first-out storage device comprises:
   a first first-in/first-out memory receiving said video signals; and
   a second first-in/first-out memory receiving said chrominance signals.

30. The video signal processing circuit of claim 28, wherein said write address generator comprises:
   a write address counter providing said write addresses in response to first oscillation signals;
   a first decoder for decoding said write addresses and providing first decoder signals indicative of receipt of a specified one of said write addresses;
   a first comparator for generating first error signals indicative of comparisons between synchronizing signals and said first decoder signals;
   a first low pass filter having a first time constant, for filtering said first error signals; and
   means for generating said first oscillation signals, oscillating at a frequency higher than said synchronizing signals, and having a phase controlled by said first error signals filtered by said first low pass filter.

31. The video signal processing circuit of claim 30, wherein said read address generator comprises:
   a read address counter for providing said read addresses in response to second oscillation signals;
   a second decoder for decoding said read addresses and providing second decoder signals indicative of receipt of a specified one of said read addresses;
   a second comparator for generating second error signals indicative of comparisons between synchronizing signals and said second decoder signals;
   a second low pass filter having a second time constant, for filtering said second error signals; and
   means for generating said second oscillation signals, oscillating at a frequency higher than said synchronizing signals, and having a phase controlled by said second error signals filtered by said second low pass filter means.

32. A luminance processor, comprising:

temporal filter means for generating first luminance signals by frame comb filtering video signals;

spatial filter means for generating second luminance signals by line comb filtering said video signals;

motion detector means for generating motion signals indicative of motion in said video signals;

soft switching means for generating output luminance signals to be recorded by mixing said first luminance signals and said second luminance signals in response to said motion signals;

non-standard input detector means for generating non-standard input signals indicative of time base error in said video signals;

first multiplexer means for selectively setting said motion signals received by said soft switching means to a first fixed value in response to said non-standard input signals;

motion processor means for modulating said motion signals to generate modulated motion signals;

second multiplexer means for selectively setting said modulated motion signals to a second fixed value in response to said non-standard input signals; and means for generating identification signals, to be combined with said output luminance signals, indicative of said video signals having time base error greater than said threshold value.

33. The luminance processor of claim 32, wherein said non-standard input signals indicate said time base error exceeding a threshold amount.

34. The luminance processor of claim 32, further comprising means for recording said non-standard input signals along with said output luminance signals.

35. The luminance processor of claim 34, in combination of a video signal processing circuit comprising:

time base correction means for performing time base correction on said video signals by temporarily storing and then providing time-base corrected video signals in response to synchronizing signals;

synchronization separator means for separating said synchronizing signals contained in said video signals from said video signals;

chroma separator means for separating chrominance signals contained in said video signals from said video signals; and chroma processor means for processing said chrominance signals for recording along with said non-standard input signals and said output luminance signals.

36. The luminance processor of claim 34, wherein said first and second luminance signals are generated in dependence upon restored bandwidth luminance signals obtained from said video signals, and in combination of a video signal processing circuit comprising:

time base correction means for performing time base correction on video signals regenerated by temporarily storing and then providing time-base corrected video signals in response to synchronizing signals;

unfolding means for generating said restored bandwidth luminance signals from said time-base corrected video signals read from said time base correction means;

chroma/luma separator means for separating said motion signals and chrominance signals from said time-base corrected video signals provided by said time base correction means; and up-converting means for up converting said chrominance signals generated by said chroma/motion separator means.

* * * * *